Sept. 17, 1935.  R. A. LIGHT ET AL  2,015,019
PISTON PACKING
Filed Sept. 8, 1934
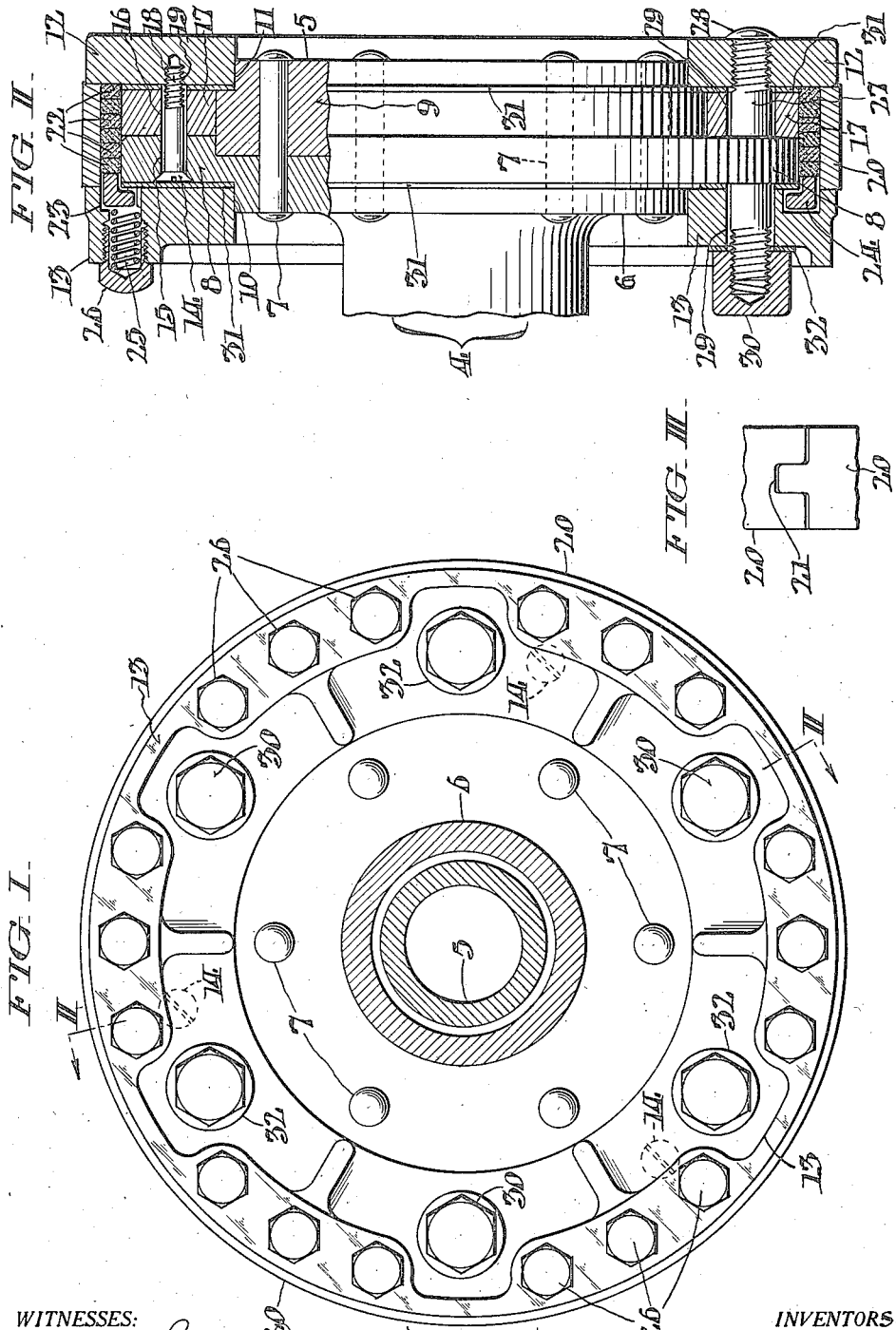
WITNESSES:
INVENTORS:
Ralph A. Light &
Joseph W. Price, Jr.
BY
ATTORNEYS.

Patented Sept. 17, 1935

2,015,019

UNITED STATES PATENT OFFICE 2,015,019

PISTON PACKING

Ralph A. Light, Cynwyd, and Joseph W. Price, Jr., Philadelphia, Pa., assignors to The United States Metallic Packing Company, Philadelphia, Pa., a corporation of Pennsylvania Application September 8, 1934, Serial No. 743,188

4 Claims. (Cl. 309—39)

This invention relates to piston packings, and more particularly to a packing, for locomotive power reverse gears, such as forms the subject-matter of a co-pending application for patent filed by us the 24th day of July, 1933, under Serial Number 681,917, and which later matured as U. S. Patent No. 1,982,614, dated November 27, 1934.

In the application referred to, the sealing ring and the packing material are located in a circumferential groove formed jointly by bull and follower rings which, in turn, are secured to a peripheral shoulder around the piston body member.

The primary object of this invention is to provide an improved packing of the type referred to that will effectively resist the action of heat when steam is the motivating medium, and which will maintain a substantially perfect fluid-tight seal between the coacting parts.

Another object is the provision of a packing which can be readily applied to a standard type of piston, for power reverse gears, with a minimum expenditure of time and labor.

Additional objects and advantages will become apparent as the following description of our invention proceeds, and for a more comprehensive understanding thereof reference will now be made to the accompanying drawing; wherein:

Fig. I is a face view of a locomotive power reverse gear piston embodying the present improvements.

Fig. II is an axial sectional view taken approximately on the plane designated by the arrows II—II in Fig. I; and Fig. III is a fragmentary detail view of a sealing ring constituting a part of our improved packing.

Referring more in detail to the drawing, the piston is comprehensively designated by the numeral 4, said piston comprising concentric components 5, 6, of conventional form, which are rigidly connected together by appropriate securing means 7, passed through registering holes in interengaging flanges 8, 9; said flanges have spaced peripheral shoulders 10, 11, respectively: while the flange 8 projects beyond, or is of greater diameter than, the flange 9, all in accordance with known practice and forming no part of this invention.

The packing with which the present improvements are more particularly concerned comprises a bull ring 12 and a follower ring 13, both of which are accurately machined to fit the respective shoulders 10, 11, as well as being of a diameter to ensure a free working fit in the cylinder, not shown, in which the piston 4 operates. To one of the shoulders 11, for example, we secure as by countersunk-screws 14 passed through registering holes 15, 16 in the flange 8, an abutting spacer-ring or annulus 17, said screws engaging, at their ends 18, in correspondingly-threaded holes 19 in the bull ring 12. Thus it will be seen that the parts 13, 8, 17 and 12 jointly afford a circumferential groove to receive a sealing ring 20 which has a tongue-and-groove split 21, Fig. III. This sealing ring 20 is of an external diameter, when fully contracted, to snugly fit the cylinder, not shown, in which it operates; while it has an internal diameter such as to provide an annular interval therebetween and the bottom of the circumferential groove afforded by the parts 8 and 17 aforesaid, and into said interval we insert suitable soft resilient packing-material 22.

On its inner face the follower ring 13 has a circular recess 23 to accommodate a freely-fitting expander ring 24, preferably of the right-angled or L-shaped radial cross-section shown, so that the one portion can enter the interval containing the packing-material 22, while the other portion provides a wider surface against which a number of helical springs 25 engage and exert compression-pressure at intervals around the follower ring 13. These springs 25 are held in compression by hollow keeper-screws 26, and they serve to yieldingly urge the expander ring 24 laterally against the packing-material 22, in an obvious manner. At this juncture it is to be noted that the countersunk screws 14 serve to hold the parts 8, 17 and 12 together, while the sealing ring 20 and packing-material 22 are applied, prior to placement of the follower ring 13 with the expander ring 24 in position. The follower ring 13 is thereupon secured by means of screw-studs 27 engaged at their one ends in the bull ring 12 and clinched over at 28; said screw-studs passing through registering holes 29 in the spacer ring 17, piston flange 8, and follower ring 13, and being engaged by cap nuts 30 at their outer ends, to hold the assembled units of the packing in proper relation.

Interposed between the inner faces of the bull and follower rings 12, 13, and the contiguous surfaces of the spacer ring 17 and piston intervening flange 8, are suitable material gaskets 31 which prevent leakage of the motivating medium past the mutually contacting surfaces of the packing as a whole; while similar material washers 32 below the cap nuts 30 serve a similar purpose with respect to the stud holes 29.

From the foregoing description it will be readily seen that the floatingly-supported ring 20 not only ensures an effective fluid-tight seal between the piston 4 and cylinder wall in which it operates; but that said ring also serves to support the weight of the piston assemblage, with incidental protection of the bull and follower rings 12, 13 from early damage in use due to irregularities developing in the associated piston crosshead and guides, not shown.

Having thus described our invention, we claim:

1. The combination with a piston body, having spaced shoulders separated by an intervening flange, of a bull ring seating on one of the shoulders and secured to the intervening flange with interposition of a spacer annulus; a follower ring seating on the other shoulder; said bull and follower rings, as well as the peripheral surface of the intervening flange and spacer annulus, jointly forming a circumferential groove; a split sealing ring in the circumferential groove; compressible packing-material filling an annular interval between the inner surface of the sealing ring and the bottom of the groove aforesaid; an expander ring disposed within a circular recess at the inner face of the follower ring and bearing laterally against the packing-material; circumferentially-spaced springs operative against the expander ring to compress the packing material and thereby maintain the sealing ring expanded in fluid-tight contact with the wall of a cylinder; means intermediate the inner faces of the bull and follower rings and the contiguous surfaces of the spacer ring and intervening flange aforesaid to prevent leakage past the mutually contacting surfaces of the packing as a whole; and means holding the several parts in assembled relation.

2. The combination with a piston body, having spaced angular shoulders separated by an intervening flange, of a bull ring seated on one of the angular shoulders and secured to the flange aforesaid with interposition of a spacer annulus; a follower ring seating on the other angular shoulder; said bull and follower rings, as well as the intervening flange outer surface with that of the spacer annulus, jointly forming a circumferential groove; a split sealing ring fitting in the circumferential groove with provision of an annular interval between its inner surface and the bottom of the circumferential groove; compressible packing-material filling the annular interval; an expander ring freely accommodated in a circular recess in the inner face of the follower ring and bearing laterally against the packing material; a series of circumferentially-spaced helical springs operative upon the expander ring to effect constant compression of the packing-material and thereby maintain the sealing ring expanded in fluid-tight contact against the surface with which it coacts; and means securing the several parts aforesaid in assembled relation.

3. The combination of claim 2 wherein the expander ring is of right-angled or L-shaped cross-section radially.

4. The combination of claim 2 wherein the sealing ring is provided with a tongue-and-groove split.

RALPH A. LIGHT.
JOSEPH W. PRICE, Jr.